US012601605B2

(12) United States Patent　　　　　(10) Patent No.:　US 12,601,605 B2
Schuettemeyer et al.　　　　　　　　 (45) Date of Patent:　　Apr. 14, 2026

(54) ELECTRONIC HORIZON FOR ADAS FUNCTION

(71) Applicant: HERE Global B.V., Eindhoven (NL)

(72) Inventors: Joerg Schuettemeyer, Berlin (DE);
Johannes Stille, Schwalbach (DE);
Jens Landvogt, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 84 days.

(21) Appl. No.: 18/575,759

(22) PCT Filed: Jul. 7, 2022

(86) PCT No.: PCT/EP2022/068944
§ 371 (c)(1),
(2) Date: Dec. 29, 2023

(87) PCT Pub. No.: WO2023/280993
PCT Pub. Date: Jan. 12, 2023

(65) Prior Publication Data
US 2024/0318972 A1　　Sep. 26, 2024

(30) Foreign Application Priority Data
Jul. 9, 2021　(EP) ..................................... 21184886

(51) Int. Cl.
*G01C 21/36*　　　(2006.01)
*G01C 21/00*　　　(2006.01)
(52) U.S. Cl.
CPC ..... *G01C 21/3617* (2013.01); *G01C 21/3815* (2020.08); *G01C 21/3889* (2020.08)

(58) Field of Classification Search
None
See application file for complete search history.

(56) References Cited

U.S. PATENT DOCUMENTS

| | | | |
|---|---|---|---|
| 9,299,023 B2 | 3/2016 | Wilson | |
| 9,689,706 B2 | 6/2017 | Denaro | |
| 10,275,664 B2 | 4/2019 | Mullen | |

(Continued)

OTHER PUBLICATIONS

Extended European Search Report for European Application No. 21184886.6 dated Jan. 7, 2022, 12 pages.

(Continued)

*Primary Examiner* — Daniel L Greene
(74) *Attorney, Agent, or Firm* — ALSTON & BIRD LLP

(57) ABSTRACT

A method is disclosed, performed at least by a mobile device or a part thereof, the method comprising: providing an indication of a trajectory of the mobile device to a remote server; obtaining, from a remote server, an electronic horizon comprising electronic horizon data for one or more ADAS functions of the mobile device, wherein the electronic horizon has been constructed from map data by the server specifically for enabling the mobile device to provide or for supporting the mobile device in providing the one or more ADAS functions, wherein the electronic horizon covers one or more potential paths predicted to be taken by the mobile device based on the indication of the trajectory; and supporting or performing at least one of the one or more ADAS functions at least partially based on the electronic horizon.

20 Claims, 6 Drawing Sheets

(56)  References Cited

U.S. PATENT DOCUMENTS

| | | | |
|---|---|---|---|
| 11,231,294 B2 * | 1/2022 | Denaro ............. | G01C 21/3697 |
| 2011/0054716 A1 | 3/2011 | Stahlin et al. | |
| 2013/0158794 A1 * | 6/2013 | Wilson ............. | B60W 50/0097 |
| | | | 706/46 |
| 2021/0064041 A1 | 3/2021 | Kim et al. | |
| 2021/0310815 A1 * | 10/2021 | Kim .................. | G01C 21/3804 |

OTHER PUBLICATIONS

International Search Report and Written Opinion for Patent Cooperation Treaty Application No. PCT/EP2022/068944 dated Oct. 20, 2022, 18 pages.
Office Action for European Application No. 21184886.6 dated Jan. 2, 2024, 6 pages.
Office Action for European Application No. 22741260.8 dated May 13, 2025, 12 pages.
NDS Association, "IDA/ADAS use cases with NDS.Live Horizon Assist and SmartLayer Path services", 3rd NDS Public Conference held Jun. 8, 2021, YouTube, <URL:https://www.youtube.com/watch?v=ICiJEIFL-B4&t=3972s>, Published Jun. 17, 2021, timestamp 01:06:12-01:23:07.
NDS Association, "Intelligent Speed Assistance Reducing Data Consumption with NDS.Live", NDS Association Webinar held Mar. 11, 2021, YouTube, <URL:https://www.youtube.com/watch?v=NiB_IkQhFjo&t=1099s>, Published Mar. 15, 2021, timestamp 18:15-32:49.

* cited by examiner

ELECTRONIC HORIZON FOR ADAS FUNCTION

CROSS-REFERENCE TO RELATED APPLICATIONS

The present application is a national phase entry of International Application No. PCT/EP2022/068944, filed Jul. 7, 2022, which claims priority to European Patent Application No. 21184886.6, filed Jul. 9, 2021, which are each incorporated herein by reference in their entirety.

FIELD OF THE DISCLOSURE

The present disclosure pertains to the concept of electronic horizons and to the provision of advanced driver assistance systems (ADAS), such as an intelligent speed assistance (ISA), road feature warning, hazard warnings, intelligent adaptive cruise control or the like, but also to the provision of map information and/or dynamic road information.

BACKGROUND

One example of an ADAS function is an intelligent speed assistance (ISA), which can be considered an advanced safety feature that prevents vehicles from exceeding the set speed limit helping to reduce collisions on roads. Thus, at the moment, regulation mandates that every vehicle sold e.g. in the European Union will require an ISA, which will have to be fitted to all new vehicles sold from May 2022. So for cost reasons, ADAS functions such as an ISA will need to be implemented with minimal resource needs, so that they can be implemented in every vehicle in an economical manner. Accordingly, vehicle manufacturers (OEMs) and other automotive providers require cost effective hardware components, which often end up with very limited data processing and storage capabilities.

Moreover New Car Assessment Programs "NCAP", such as European New Car Assessment Program "Euro NCAP" or the United States New Car Assessment Program "US NCAP" or the Australasian New Car Assessment Program "ANCAP", allow reaching a higher score in the respective NCAP evaluation when road feature warnings, hazard warnings, intelligent adaptive cruise control are implemented.

Now, while speed limits (and other road signs) change comparably frequently due to many different factors, it still needs to be made sure that the vehicles obtain the information in a reliable manner. Thus, for ADAS functions like the ISA, the primary source of information is and remains the camera system of the vehicle. However, usually a data fusion with map data (containing speed limit information, among other attributes) is required to ensure the necessary quality level for ISA.

In map data, which is employed for this purpose, speed limits and other signs posted adjacent to roads are usually recorded as map objects, with their locations stored either in coordinate point format (WGS-84) or in relation to the road link (e.g. with a Link ID and an offset along that link). ADAS systems can then rely on map information that provides the relevant speed limit for the section of the road where the vehicle is currently located.

One solution would be to require the respective vehicles to have access to a local reference map, included in many cases as part of e.g. the navigation systems. For vehicles which have access to such a map on board, the required data for the respective ADAS function may then be retrieved from the onboard map—assuming the data remains updated regularly. Updates to the map would need to be pushed over the air (i.e. over a wireless data connection) or via USB/SD cards. Information related to ADAS functions, such as the speed limit and other features which may aid in speed limit detection are then updated as part of a map tile or region update. However, the storage of a complete map database and the retrieval of the information of interest (e.g. the speed limit information and possibly auxiliary location information to aid the on-vehicle camera-based speed limit detection for an ISA) requires significant local storage and processing resources, which may not be an option for every vehicle type as manufacturers may aim to retain their vehicle architecture.

For vehicles without an onboard map, such map data would need to be retrieved via an online connection, e.g. after providing the vehicle position to a server. For instance, a map tile (such as a standardized tile compliant with the Navigation Data Standard "NDS") or an individual map layer could be provided in response, either via a map update or streaming, containing the required information (e.g. location of speed limits) for the respective tiled portion of the map.

However, firstly it may still require significant resources to transfer and extract the relevant data from the map data, because a tile usually encompasses an area of about 1-4 km², which may be highly complex and include many features which increase the data size of the tile, particularly in urban scenarios. A tile would therefore usually contain both relevant and irrelevant features for supporting an ISA. Even if a targeted tile map layer with ISA supporting features would be provided, the tile would often contain features of roads irrelevant to the vehicle path. More specifically, if for instance NDS compliant tiles for delivering information relevant to a location of the vehicle are used, the drawback is that these tiles need to be pre-compiled, which also has a significant latency drawback. This results in tile-based systems not being able (or at least not efficiently being able) to carry dynamic information such as traffic conditions, road conditions (slippery, wet, dry, icy, mud, snow . . . ), road hazard conditions (construction, accidents, obstructions, etc.)

Secondly, as data connections may not always be available, it may not even be possible to reach and query the remote server for respective map data in order to then extract the information of interest, such as speed limit and other posted sign information.

In certain aspects, the present disclosure thus inter alia addresses the problem of how to provide information required for certain ADAS functions (such as speed limit information for an ISA function) to vehicles with limited processing resources and—in particular—without a local map database. In certain aspects, the present disclosure also addresses the problem of limited network coverage and limited network transfer for providing information required for ADAS functions via an online connection. In certain aspects, the present disclosure also provides an improved data protection.

SUMMARY OF SOME EXEMPLARY EMBODIMENTS

According to a first exemplary aspect, a method, performed at least by a mobile device or a part thereof, is disclosed, the method comprising:

provving an indication of a trajectory of the mobile device to a remote server;

obtaining, from the remote server, an electronic horizon comprising electronic horizon data for one or more ADAS functions of the mobile device, wherein the electronic horizon has been constructed from map data by the server specifically for enabling the mobile device to provide or for supporting the mobile device in providing the one or more ADAS functions, wherein the electronic horizon covers one or more potential paths predicted to be taken by the mobile device based on the indication of the trajectory; and supporting or performing at least one of the one or more ADAS functions at least partially based on the electronic horizon.

The mobile device performing the method of the first exemplary aspect may for instance be a vehicle, a car, a motor bike or the like. However, the mobile device or the part thereof may also be a navigation system integrated into a vehicle. Further, the mobile device may also be a smartphone, for instance. As will be explained in more detail below, a part of the mobile device may for instance be a software and/or hardware component of the aforementioned entities, such as a functional component, a client component, a module, a circuitry, a chip, a microprocessor or the like.

According to a second exemplary aspect, a method, performed at least by a server or a part thereof, is disclosed, the method comprising:

obtaining, from a remote mobile device, an indication of a trajectory of the mobile device, constructing an electronic horizon from map data specifically for enabling the mobile device to provide or for supporting the mobile device in providing one or more ADAS functions, wherein the electronic horizon comprises electronic horizon data for the one or more ADAS functions of the mobile device, wherein the electronic horizon data covers one or more potential paths predicted to be taken by the mobile device based on the indication of the trajectory; and providing, to the mobile device, the electronic horizon for performing, by the mobile device, at least one of the one or more ADAS functions at least partially based on the provided electronic horizon data.

The at least one server performing the method according to the second exemplary aspect may for instance be or comprise a server of a map provider or distributor. The at least one server may also be realized by multiple servers or a distributed architecture and may for instance be or comprise a distributed server, a network edge server, or a cloud server. The server may also comprise a database (e.g. a map database) or be in communication with an (e.g. external) database or a database server. As will be explained in more detail below, a part of the server may for instance be a software and/or hardware component thereof, such as a functional component, a server component, module, a circuitry, a chip, a microprocessor or the like.

The mobile device or part thereof performing the method of the first aspect and the at least one server performing the method of the second aspect may work together to perform embodiments of the methods of the first and/or second aspects.

According to each of the first and second exemplary aspect of the invention, a computer program product is also disclosed, the computer program product when executed by a processor causing an apparatus to perform and/or control the actions of the method according to the respective exemplary aspect of the present invention.

The computer program product may be stored on computer-readable storage medium, in particular a tangible and/or non-transitory medium. The computer readable storage medium could for example be a disk or a memory or the like. The computer program product could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to each of the first and second exemplary aspect of the invention, an apparatus (i.e. a mobile device or a part thereof/a server or a part thereof) is disclosed, configured to perform and/or control or comprising respective means for performing and/or controlling the method according to the respective exemplary aspect of the present invention.

Generally, the means of the respective apparatus of any aspect can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

More specifically, according to each of the first and second exemplary aspect of the invention, a respective apparatus (i.e. a mobile device or a part thereof/a server or a part thereof) is disclosed, comprising at least one processor and at least one memory including computer program code, the at least one memory and the computer program code configured to, with the at least one processor, cause an apparatus at least to perform and/or to control the method according to the respective exemplary aspect of the present invention.

The above-disclosed apparatus may be a module or a component for a device, for example a chip. The disclosed apparatus according to any aspect of the invention may comprise only the disclosed components, for instance means, processor, memory, or may further comprise one or more additional components.

According to any of the first and second exemplary aspect of the invention, a system comprising multiple apparatuses (e.g. a mobile device and an vehicle in case of the first exemplary aspect or multiple servers in case of the second exemplary aspect, for instance) is also disclosed, wherein said apparatuses are configured to cooperate for performing the method according to the respective exemplary aspect of the invention or one of said apparatuses is configured for performing the method according to the respective exemplary aspect of the invention alone.

In particular, according to a further exemplary aspect, a system is also disclosed comprising a mobile device or a part thereof and a server or a part thereof together performing the method according to the first and/or second exemplary aspect. In particular, the mobile device or a part thereof may be configured to perform the method according to the first exemplary aspect and the server or a part thereof may be configured to perform the method according to the second exemplary aspect.

In the following, exemplary features and exemplary embodiments of all aspects of the present invention will be described in further detail.

That the mobile device and the server are located remote to each other may be understood to mean that they in particular communicate at least in part over a wireless communications network, such as a cellular communication system (e.g. a communication system utilizing GSM, WCDMA, LTE, 5G and/or any future generation technology) and/or a non-cellular communication system (e.g. a wireless local area network). Generally, a cellular communication system may for instance be characterized by a basically seamless pavement of a geographical area (usually in the order of at least hundreds or thousands of square kilometers) with cells in which coverage is provided by respective nodes of the communication system that are operated by the same operator, which network may for instance support communication handover between cells. Consequently, a non-cellular communication system may be characterized as a communication system that does not have all of these properties. In more detail, examples of a cellular communication system or network are a second generation (2G, for instance the Global System for Mobile Communication (GSM), the General Packet Radio System (GPRS), the Enhanced Data Rates for GSM Evolution (EDGE) or the High Speed Circuit-Switched Data (HSCSD)), third generation (3G, for instance the Universal Mobile Telecommunication System, UMTS, WCDMA, TD-SCDMA or CDMA-2000), fourth generation (4G, for instance the Long Term Evolution, LTE system, the LTE Advanced (LTE-A) system or the IEEE 802.16m WiMAX system), fifth generation (5G) or newer communication system or network. Further examples of a non-cellular communication system or network are a WLAN (e.g. a WiFi or IEEE 802.11) system, a WiMAX (e.g. a IEEE 802.16) system, a Satellite InternetAccess system, Bluetooth (LE) system, a ZigBee system, a radio-frequency identification (RFID) system, a broadcasting network such as for instance Digital Video Broadcasting (DVB), Digital Audio Broadcasting (DAB) or Frequency-Modulated (FM)/Amplitude-Modulated (AM) system, a Near Field Communication (NFC) system, etc.

An advanced driver assistance system (ADAS) function may generally be understood as an electronic technology for assisting a driver in e.g. driving and/or parking. For this, an ADAS may make use of a human-machine interface. An ADAS may use sensors (e.g. cameras), to detect nearby obstacles or driver errors, and respond accordingly.

An ADAS function may for instance alert the driver to problems, implement safeguards, and/or take control of the vehicle if necessary. For instance, an ADAS function may provide speed limit assistance, automate lighting, adaptive cruise control, assist in avoiding collisions, incorporate satellite navigation and traffic warnings, alert drivers to possible obstacles, assist in lane departure and lane centering, provide navigational assistance through smartphones, to name a few examples.

With respect to the example of an intelligent speed assistance, this function may for instance use information about the road or road side objects to determine an allowed or adequate speed, as will be explained in further detail below. In any case, the ISA function is understood only as an example of a possible ADAS function for the present invention.

An electronic horizon may for instance refer to a partial representation of a traffic or road network. For instance, an electronic horizon may for instance comprise data on one or more road links or segments, intersections, road side objects, road geometry and/or attributes of roads or road objects. The representation of the traffic network may lead out from a current position of the mobile device e.g. to a certain limited (e.g. predicted depending on the specific circumstances) extent. Thus, the electronic horizon may represent the traffic network (e.g. road(s), attributes etc.) ahead of (or possibly behind) the mobile device. In that sense, the electronic horizon may be representation of potential paths to be taken by the mobile device from its current position in the near future. Thus, the electronic horizon may be understood to refer to a collection of data representing a partial traffic network leading away from the current position of the mobile device to a limited extent and thereby forming the electronic horizon.

Thus, the electronic horizon comprises data derived from map data about a portion of the traffic network ahead, which can then be used by a respective ADAS applications to implement the corresponding ADAS functionality with respect to the mobile device.

The indication of a trajectory provided by the mobile device can for instance comprise or consist of one or more locations (e.g. coordinate pairs), a heading (e.g. a vector) and/or the (e.g. current) speed. It may be advantageous to provide the last N locations of the mobile device, as will be describe in more detail below.

In addition to the trajectory, the mobile device or part thereof may further provide, to the remote server, an indication of the one or more ADAS functions to be supported or performed by the mobile device or part thereof. In case different functions are supported, it is advantageous, when the mobile device (client) provide an indication of which function it is aiming to provide, so that an application-specific electronic horizon can be constructed, specifically in case a specific server URL is providing multiple ADAS functionalities.

Additionally or alternatively, different URLs may also be used for different ADAS functionalities. For instance, there may be a one-to-one mapping between the functionalities and the URLs.

As the electronic horizon covers one or more potential paths predicted to be taken by the mobile device, the construction of the electronic horizon involves predicting the path or paths that the mobile device is likely to travel in the immediate future. This ensures that the necessary data is transmitted over to the mobile device to allow implementation of the respective ADAS function by the mobile device as it travels. When determining a suitable portion of the traffic or road network ahead for inclusion when constructing in the electronic horizon, the server may balance the provision of sufficient data to ensure that ADAS functionality may be adequately implemented by mobile device while avoiding overloading the mobile device and its ADAS applications.

Firstly, in this regard, the determination of the size or extent of the electronic horizon to be constructed by the server may be data size driven. This may in particular allow for maintaining an optimal cache utilization (e.g. by delivering paths of lengths potentially crossing multiple tiles). Accordingly, the requests for obtaining an electronic horizon at the mobile device may be made at irregular intervals, which irregular may in particular provide a better privacy protection. This is in contrast to an approach, where the extent of each obtained electronic horizon is based on and in particular limited to the edge of a respective tile (meaning that there has to be at least one request per tile), which requests may allow to draw conclusions on the identity which may be a privacy protection issue. The described approach on the other hand may advantageously work on the basis of a path rather than a tile. The path can be dynamically scaled (i.e. shortened or prolonged), depending on various factors such as speed, available cache, expected connectivity, strategy to minimize data transfer cost etc (as will be described in more detail below).

Secondly, the requests can be managed without keeping state server-side, which 1) simplifies the implementation, 2) saves resources and 3) lowers the privacy risk of storing location data.

Thirdly, the payload size of the electronic horizon can be tuned to fit on a fixed number of cell data packages (ideally, only on one), so that there is less communication overhead when providing the electronic horizon data. For instance, TCP has a maximum payload size of 64 kb, which could span several tiles (particularly on a highway away from population centers). The extent of the electronic horizon may be subject to further considerations as will be explained in more detail below.

Further, since the electronic horizon covers one or more potential paths predicted to be taken an electronic horizon can be obtained which extends farther than it is currently needed by the respective ADAS applications, so data can be delivered to the ADAS applications for some time from a single electronic horizon data set from the server. This applies both when an ADAS application needs information just for the current location, or when it itself needs an electronic horizon (in the latter case the electronic horizon provided to the ADAS applications may be less extended than the one obtained from the server). Moreover, it is not necessary, to deliver the electronic horizon incrementally, continuously updating it with additional data relevant at the current position, rather a one-time sending (even though repeatedly) of a full electronic horizon (with more data than needed right now) can be done.

The electronic horizon has been constructed from map data by the server specifically for enabling the mobile device to provide the respective ADAS function(s) or to at least for supporting the mobile device in providing the respective ADAS function(s). Thus, the electronic horizon may be considered to be specifically constructed for a certain situation or circumstances (e.g. based on a certain position of the mobile device, a certain potential paths predicted to be taken by the mobile device and/or certain ADAS function(s) to be provided). Thus, an electronic horizon may be considered to be dependent on the current position of the mobile device, the path(s) predicted to be taken by the mobile device and/or the ADAS function(s) to be supported by the electronic horizon.

Moreover, in contrast to the original digital map data (e.g. complete map tiles or certain layers of a map tile) as it is stored in a map database, an electronic horizon is constructed or derived from this map data by the server. In other words, the data of the electronic horizon has already been extracted from this map data, so that only data specifically relevant or required for the respective ADAS function(s) maybe included in the electronic horizon. Thus, the electronic horizon may comprise less data than for instance the original map with the same geographic extent.

In view of the above, the drawback outlined at the beginning becomes apparent. The drawback with NDS tiles is that these still need to be pre-compiled, which has a significant latency drawback. This results in tile-based systems not being able (or at least not efficiently being able) to carry dynamic information such as traffic conditions, road conditions (slippery, wet, dry, icy, mud, snow . . . ), road hazard conditions (construction, accidents, obstructions, etc.). By delivering a targeted (e.g. non-tile based) electronic horizon as described herein, dynamic features where timing is critical (e.g. accidents) can be communicated efficiently.

This allows for true timeliness or currentness of the data, not possible with pre-compiled and significantly larger NDS tiles.

To provide an example of a format or data structure for an electronic horizon it is referred to the ADASIS specification (such as ADASIS version 1, version 2 or version 3). However, the specific implementation and data structure of the electronic horizon is not limited by the present disclosure.

In order to construct the electronic horizon such that it covers one or more potential paths predicted to be taken by the mobile device, more than just a current position (such as a current car position CCP, the heading and speed of the mobile device, the local time etc.), may need to be considered. For instance, a certain number of the last position estimates may be considered, as will be explained in more detail below. Additionally or alternatively, other information such as expectations based on previously taken paths of mobile entities at the same position may be considered.

In this regard, the method according to the first and/or second aspect may further comprise the step of predicting one or more potential paths, which are likely to be taken by the mobile device so that the electronic horizon data can then cover the one or more potential paths. For instance, only paths which are taken with a probability above a (e.g. predefined or dynamically calculated) threshold may be considered. For instance, the electronic horizon may cover the most probably path and sub-paths, e.g. as long as they are above the threshold. For instance, only potential paths up to a (e.g. predetermined) maximum distance, radius and/or expected travel time from a current position of the mobile device may be used for the electronic horizon.

While an ADAS performed by the mobile device may be based solely on the data from the electronic horizon, an ADAS function typically considers further data, such as sensor inputs from the mobile device, as will be explained in more detail below. Accordingly, the ADAS functions(s) may at least partially be based on the electronic horizon.

The exemplary aspects may in particular have the advantage that, compared to for instance the usual provision of map data, only a reduced amount of data needs to be provided, because the electronic horizon has been constructed online on a server from map data specifically for providing the one or more ADAS functions in the first place. This saves storage and processing resources (and thus expensive hardware) at the mobile device. Additionally, as the electronic horizon does not only comprise electronic horizon data covering a current position of the mobile device but also one or more potential paths predicted to be taken by the mobile device, repeated retransmission of data and connectivity gaps can be bridged. The latter may in particular by facilitated by considering connectivity maps, as will be explained in more detail below.

According to an embodiment of any of the exemplary aspects, the electronic horizon is obtained by repeatedly obtaining a replacement electronic horizon comprising replacement electronic horizon data. The provision and obtaining of the electronic horizon may be considered as an online service. The replacement electronic horizon may be provided by the server and obtained by the mobile device on the fly. For instance, it may be checked whether the mobile device is close to a border of the electronic horizon (i.e. close to geographical positions which are not covered by the electronic horizon anymore), which may, for instance, be determined by the mobile device and/or by the server. For instance, this may be achieved by checking position estimates of the mobile device and e.g. comparing it to a coverage of the electronic horizon presently used at the mobile device and/or by checking the time which has lapsed since a (e.g. last) determined position of the mobile device and comparing it to an estimated time until the mobile device is expected to reach the border of the electronic horizon from there. In case e.g. the mobile device determines that it is close to a border of the electronic horizon it may request a new or replacement electronic horizon. In case e.g. the server determines that the mobile device should be close to a border of the electronic horizon it may push a new or replacement electronic horizon to the mobile device. As already mentioned above, in contrast to an electronic horizon protocol incrementally maintaining an electronic horizon stored on the client-side (i.e. at the mobile device) by sending many small updates, the described approach is different, as a new replacement horizon is sent from time to time, which completely replaces the electronic horizon stored on the client (non-incremental update). Advantageously, the current state of the client (as it is necessary with other server-based electronic horizon implementations) does not need to be stored. Rather, only the position that the mobile device needs an electronic horizon for, is required.

According to an embodiment of any of the exemplary aspects, the electronic horizon only comprises electronic horizon data required and/or useful specifically for the one or more ADAS functions. For instance, the electronic horizon may not comprise electronic horizon data which may only be useful for other ADAS functions. For instance, the electronic horizon data may not comprise electronic horizon data which is not essential, required and/or not useful for the one or more ADAS functions. For instance, the electronic horizon comprises electronic horizon data only for one, two or three different ADAS functions.

In one example, the all of the electronic horizon data of the electronic horizon may be required and/or useful for one ADAS function. For instance, the electronic horizon may be provided by a server specifically dedicated for providing an electronic horizon constructed for this ADAS function. For instance, in case the electronic horizon data shall enable or support an intelligent speed assistance function of a mobile device, the electronic horizon may be provided by a speed limit online (SLO) server. However, the construction of the electronic horizon by the server may also comprise the steps of identifying one or more ADAS functions which shall be supported by the electronic horizon and then constructing the electronic horizon based on these one or more identified ADAS functions.

According to an embodiment of any of the exemplary aspects, the electronic horizon data comprises reduced road geometry information. Reduced road geometry information may in particular refer to reduced road geometry information compared to road geometry information which is comprised by the map data from which the electronic horizon is constructed. For instance, the electronic horizon data may not comprise a precise representation of the road geometry. For instance, the electronic horizon data may in particular not comprise one or more of the following road geometry information: latitude/longitude information of every point, a spline representation, a clothoid representation and/or a curve based representation of a road or road segment. For instance, the electronic horizon data may only comprise a linear road segments or links with information about the length of the individual links or segments but with no road geometry for the individual road links or segments. For instance, with respect to an intelligent speed assistance function, the electronic horizon data may however comprise speed limit information for the individual road links or segments.

While a reduced road geometry may make a matching of the position of the mobile device with respect to the electronic horizon more difficult or less precise, it may still reduce the required processing power, in particular in case the reduced road geometry is made up for or balanced by considering other information instead, such as data obtained from sensor of the mobile device, as will be explained in more detail below.

The method according to the first exemplary aspect may further comprise:

constructing, based on the obtained electronic horizon, an internal electronic horizon for distributing the electronic horizon data obtained with the electronic horizon within the mobile device.

For instance, an internal (or local) electronic horizon may be constructed comprising a subset of the electronic horizon data comprised by the obtained electronic horizon (which may thus in contrast be considered as an "external", "cloud-based" or "remote" electronic horizon). The internal or local electronic horizon is only used for distributing data (from the obtained electronic horizon) internally or locally in the mobile device. This may further facilitate the distribution of the obtained electronic horizon to the respective components or modules in the mobile device. For instance, in one example, the mobile device may comprise a client component for receiving the electronic horizon and for constructing an internal electronic horizon in order to forward the electronic horizon data of the received electronic horizon (or a part thereof) to further components in the mobile device, e.g. to a fusion component, which may further obtain sensor data from the mobile device and consider those two data sources for providing the ADAS function. Forwarding or providing the internal electronic horizon can be done in multiple ways, e.g. providing a proprietary API inside the mobile device (e.g. the ECU) or distributing it via a standard protocol like ADASISv2.

Accordingly, the method according to the first exemplary aspect may further comprise:

obtaining sensor data from one or more sensors of the mobile device, wherein said performing of at least one of the one or more ADAS functions is further at least partially based on the obtained sensor data.

The sensors used for performing the ADAS function may depend on the specific ADAS function to be performed. For instance, a sensor of the mobile device may be a camera. A camera may be useful for performing an ISA function, as the camera may detect roadside signs (directly or indirectly) providing information about the currently valid speed limit to observe. However, other sensors such as an accelerometer, a gyroscope, an odometer, or various other sensors typically used and implemented in vehicles, may be used depending on the specific use case or ADAS function to be implemented. For instance, the obtained sensor data and the electronic horizon data (e.g. by means of the obtained electronic horizon or as a locally constructed internal electronic horizon) may be provided to a fusion component of the mobile device, which may then fuse or combine the electronic horizon data and the sensor data for providing the ADAS function (or data required therefore).

According to an embodiment of any of the exemplary aspects, the one or more ADAS functions comprise one or more of:

an intelligent speed assistance function;

a hazard warning function;

an emergency vehicle indication function; and/or a traffic sign detection function.

As already mentioned, an intelligent speed assistance (ISA) function may for instance use information about the road or roadside objects to determine an allowed or adequate speed. For instance, information can be obtained from knowledge of the position of the mobile device (with respect to the electronic horizon), taking into account speed limits known for the position, and/or by interpreting road features such as signs (respective data being obtained e.g. from sensor). Generally, an ISA may 1) inform the driver about the current speed limit, 2) alert the driver in case of overspeeding, and/or 3) assist the driver/car to stay below the speed limit by actively adjusting the vehicle speed (with in particular actions 2) and 3) being optional, while 1 is typically a mandatory implementation). In other words, an ISA may alert a driver (passive ISA, e.g. via displaying visual and/or auditory cues, such as visual and/or auditory warnings, and/or tactile cues, such as a vibration of steering wheel or the accelerator pedal) or actively adapt the speed (active ISA), e.g. by reducing the throttle input and/or by applying brakes (while the drive may usually nevertheless override any such adaptions). Such alerts and/or adaptions may occur for instance when a vehicle has entered a new speed zone, when different speed limits are in force according to time of day or conditions and/or when speed limits are exceeded. Additionally or alternatively, an ISA may provide information about driving hazards (e.g. high pedestrian movement areas, railway crossings, schools, hospitals, etc.) and limits enforced by e.g. radar or speed cameras. The method according to the first aspect may in particular comprise a respective method step of e.g. alerting the driver and or adapt the speed of the mobile device. In any case, generally, the purpose of an ISA is to assist the driver to maintain a safe speed.

An intelligent speed assistance function may use or rely on conditional, implicit, dynamic and/or temporary speed limits. For instance, speed limits may depend on the weather (e.g. rain/wetness, snow/icy) and/or the time (e.g. time of day, season). For instance speed limits may be implicit speed limits (e.g. road type, (e.g. highway/motorway), type of area (e.g. residential area), city entry/exit). For instance, speed limits may be dynamic speed limits (e.g. dynamic speed signs, or speed limits due to roadworks). Specifically in case of dynamic and temporary speed limits an approach relying on pre-compiled tiles cannot easily achieve a high timeliness of the information contrary to the approach described herein.

A hazard warning function may indicate different in particular temporary and/or local hazards to the driver and/or actively engage into a driving functionality of the vehicle. Examples of such hazards are an accident, a flooding, a traffic jam, a road closure for instance.

Another example of an ADAS function may be an emergency vehicle indication function, which may indicate to the driver that an emergency vehicle is approaching and/or actively engage into a driving functionality of the vehicle, so that a corridor for an emergency vehicle can be formed.

These above examples of a hazard warning function or an emergency vehicle indication function are supported by delivery of dynamic location data (as opposed to static map data). Such data can be included in the electronic horizon data that is being dynamically assembled by the server as described herein, which is not or not easily viable in an delivery mechanism based on (NDS) data tiles.

A traffic sign detection or recognition (TSR) function, as another example, can recognize common traffic signs, such as a "stop" sign or a "turn ahead" sign, through image processing techniques (e.g. based on the sign's shape or color). Due to the use of camera-based technology, various factors (poor lighting, weather conditions, partial obstruction of the sign) can make the optical TSR less accurate. A traffic sign detection may also form part of the ISA function (e.g. as one input to a fusion component for merging the data with the electronic horizon data).

The above ADAS functions (but also ADAS functions in general) may in addition to the electronic horizon inter alia rely on data provided by Vehicle-to-Vehicle (V2V) communication, Vehicle-to-Infrastructure (V2I) communication, and/or Vehicle-to-Everything (V2X). V2V systems allow vehicles to exchange information with each other about their current position and upcoming hazards (which may in particular be advantageous for the hazard warning function or emergency vehicle approaching function). V2I systems occur when the vehicle exchanges information with nearby infrastructure elements, such as street signs (which may in particular be advantageous for the traffic sign recognition or the intelligent speed assistance). V2X systems occur when the vehicle monitors its environment and takes in information about possible obstacles or pedestrians in its path.

According to an embodiment of any of the exemplary aspects, one or more of the following information is comprised by or derivable from the electronic horizon data:
a country code;
a type of a road;
a road heading;
a side of driving;
a distance to a next intersection;
a number of lanes in driving direction;
a number of lanes opposite the driving direction;
an indication of an urban area zone;
a road curvature and/or an associated maximum speed;
information on a roundabout;
information on a junction;
information on a ramp;
information on a intersection;
information on a traffic light;
information on a stop sign;
information on a yield sign; and/or
information on a one-way, wrong-way and/or no entry sign.

The above information is in particular helpful if the electronic horizon has at least been constructed for the ADAS function of an intelligent speed assistance.

More specifically, a country code information may be important as it provides for expected road sign characteristics to perform a detection, as e.g. speed limit signs differ slightly between countries. Also, a country code may provide information for implicit speed limits (e.g. a city entrance or exit sign may imply certain speed limits).

Information on a type of road may refer to the category of road (e.g. Freeway, Highway, Local Road, etc.), which may also provide an indication of the expected size and position for the posted sign limits, especially in connection with the country code, and/or implicit speed limits applying to the road.

Information on a side of driving (i.e. a right or left hand drive attribute) provides an indication of for the mobile device to expect relevant (e.g. speed limit) signs on one side or the other. For instance, in case of right hand driving the mobile device may only look for or detect signs on the right hand side and vice versa. However, this information may also be implied or derivable from the country code, for instance.

Information on a distance to an intersection may provide additional information on where (along the road) or when to expect or search for (e.g. speed limits) signs, while information on the number of lanes in and/or opposite the driving direction may aid in an estimation of a lateral distance (i.e. transverse to the road) from the vehicle to the (e.g. speed limit) sign.

An indication of an urban area may allow to derive further configurations or constrains to be considered e.g. for the detection of road signs, and which may require a detection algorithm to operate e.g. in a different manner or mode, e.g. employing a different segmentation of captured images than e.g. compared to in the open road.

If the electronic horizon comprises information on features such as roundabouts, junctions, ramps. Intersections, traffic lights, stop signs, yield signs, the electronic horizon data may for instance comprise information on a respective feature, such as an indication of the presence, the position or another property of a respective feature.

The electronic horizon may further comprise information associated with or referenced with links. For instance, the electronic horizon data may comprise historical speed profiles. Such a speed profile may be provided for one or more road links. Such information may not be a map object as such, but link-referenced information. Such information may be useful specifically for an intelligent adaptive cruise control (iACC).

As further examples, information on one or more of the following may be comprised by or derivable from the electronic horizon data:

a dynamic speed limit;

traffic jams;

construction zones;

accident ahead;

wrong way driver;

stopped vehicle on hard shoulder;

items on road (such as animals, persons, debris, etc);

poor road conditions (incl. slippery roads, for instance);

poor weather conditions (e.g. fog, heavy rain, etc); and/or emergency vehicle ahead and/or approaching.

The above may be considered to be dynamic features or local hazard information being of a dynamic nature compared to the before described rather static features. Nevertheless, the above information may be specifically useful for an iACC.

Accordingly, the electronic horizon may be constructed from and/or the electronic horizon data may comprise one or more of the above dynamic features (or information indicative thereof) specifically for enabling the mobile device to provide or for supporting the mobile device in providing the one or more ADAS functions.

Any of the above information may be used by the vehicle (e.g. a fusion component) to support data acquisition and/or evaluation by vehicle sensors (such as a camera).

The method according to the first exemplary aspect may further comprise one or more of:

checking whether the electronic horizon needs to be updated or replaced;

sending and/or receiving a request for information to be used for at least one of the one or more ADAS functions;

identifying a position of the mobile device with respect to the electronic horizon; and/or determining and/or providing information to be used for at least one of the one or more ADAS functions based on the electronic horizon.

According to an embodiment of the exemplary aspects the indication of the trajectory comprises one or more position estimates heading information and/or speed information of the mobile device, and/or the indication of the trajectory is provided in response to determining that the electronic horizon needs to be updated.

In one embodiment the method may further comprise:

determining that the electronic horizon needs to be updated or replaced in case a remaining extent of the electronic horizon is less than or equal to a minimum extent;

obtaining an updated or replacement electronic horizon with a desired extent.

For instance, the mobile device (or the part thereof) may repeatedly check whether the electronic horizon needs to be updated. For this, the mobile device may determine its geographic position (e.g. by means of satellite positioning and/or sensors, such as odometer, gyroscope, accelerometer, etc.) and compare it identify this position in or with respect to the electronic horizon. As a result of this checking it may be determined that an update is required. For instance, in case the position is close (e.g. below a predefined threshold) to a border of the electronic horizon, the mobile device may determine that an update is required and may request an update of the electronic horizon. In one example, the it may be decided whether the electronic horizon may need to be updated by defining a first or minimum electronic horizon extent or extension (in particular ahead of the vehicle, e.g. in distance or time units) and a second or desired electronic horizon extent or extension (in distance or time units) and by applying the following scheme: If the actual remaining extension (e.g. distance or time from current position to border of electronic horizon) becomes less than or equal to a pre-defined minimum extension, it is determined that the electronic horizon needs to be updated or replaced, and the new electronic horizon is then created (at least) with the desired extension and provided as an (incremental) update or a replacement electronic horizon. The extent may also be larger, e.g. because connectivity gaps may need to be avoided as described in more detail below. As a result, there is usually quite some time until—due to the vehicle moving ahead—the remaining extension of the electronic horizon reaches the minimum extension and new electronic horizon data is obtained. Generally, this approach works both with incremental updates (which then provide large increments at long intervals, quite unlike standard protocols like ADASIS that provide frequent small increments) or with the previously described full stand-alone or replacement updates (which are much easier to implement and to handle since the server does not need to know the client state). While the checking and deciding whether the electronic horizon needs to be updated, may be done by the mobile device, it is generally also possible that the mobile device provides position estimates to the server and the server then performs the above described checking.

Additionally or alternatively, there may be a failed matching (i.e. the mobile device may not be able to match its position to any feature of the current electronic horizon), which may also be a reason to request a new electronic horizon. However, other events or circumstance which may demand an update of the electronic horizon are also possible.

For instance, in response to determining that the electronic horizon needs to be updated, the mobile device may provide, to the server, one or more position estimates of the mobile device. For example, the mobile device may provide the last n position estimates (e.g. the last 1, 2, 3 4 or 5 position estimates), which may for instance comprise latitude and longitude information. In case more than one position estimate is provided this may allow the server to also determine a heading and/or speed of the mobile device.

Additionally or alternatively, the position estimate(s) may also directly comprise speed information and/or a heading information.

As becomes clear from the above, positioning information of the mobile device may be useful for two different purpose. On the one hand, the positioning information may be used as (or together with other information, such as heading and/or speed information as apart of) the trajectory information in order to be sent to the server (e.g. when the position is or is about to be outside of the electronic horizon). At the server, a map matching can be done and an electronic horizon can be constructed, as described. On the other hand, positioning information can be done (e.g. regularly) at the mobile device based on the already obtained electronic horizon.

As already mentioned, the mobile device may for instance comprise a client component and a fusion component. The fusion component may for instance require information to be used for at least one of the one or more ADAS functions and may thus send a corresponding request to the client component, which in turns receives the request (for instance, the fusion component may send a request for speed limit information to the client component). Alternatively, the client component may actively provide this information to the fusion component (or generally within the mobile device), e.g. via the local or internal electronic horizon.

In order to provide the requested information (e.g. to the fusion component), the mobile device (e.g. a client component) may identify a position of the mobile device with respect to the electronic horizon (i.e. an electronic horizon based map match).

The mobile device may determine and/or provide information to be used for at least one of the one or more ADAS functions based on the electronic horizon. For instance, based on the identified position of the mobile device with respect to the electronic horizon, the mobile device (e.g. the client component) may determine and then provide information of the electronic horizon relevant for the relevant ADAS function (e.g. to the fusion component). The distribution or provision of the information to be used for the ADAS function(s) may in one example, as already mentioned, use an internal electronic horizon which is constructed (e.g. by the client component) based on the obtained electronic horizon and then this internal electronic horizon is transmitted internally within the mobile device (e.g. to the fusion component).

According to an embodiment of any of the exemplary aspects, an extent of the electronic horizon takes into account an expected availability of a network connectivity between the mobile device and the server. Accordingly, the server may determine an extent of the electronic horizon at least in part based on an expected availability of a network connectivity between the mobile device and the server, wherein said constructing of said electronic horizon is then at least in part based on said determined extent. For this network coverage or connectivity information (such as a connectivity map) may be used. As described, an extent may be understood as a geographic extent covered by the electronic horizon data. For instance, by taking into account an availability of a network connectivity between the mobile device and the server, the (geographical) extent of the electronic horizon may be chosen such that the border of the electronic horizon is not located in an area with a connectivity gap. The network connectivity or gap may be specific to a certain service provider used by the mobile device for a connection to the server (e.g. a specific provider chosen by a car maker). Thus the network service provider may be considered as a parameter and in particular also provided to the server for consideration when constructing the electronic horizon. Generally, a connectivity gap may be understood to be an area with no, low and/or slow connectivity (e.g. reception and/or bandwidth below a threshold). As explained, the electronic horizon covers one or more potential paths predicted to be taken by the mobile device. For instance, these predicted paths may be chosen such (e.g. sufficiently long) that connectivity gaps are avoided when the mobile device requires an updated electronic horizon. For instance, this aspect may be taken into account by the server when constructing the respective electronic horizon. For instance, network coverage information may be used in order to determine, whether there is the risk that an updated electronic horizon will need to be updated in a connectivity gap. For instance, it may be avoided that at least the most probably path (MPP) covered by electronic horizon ends in an area of a connectivity gap. Additionally or alternatively, this aspect may also be considered by the mobile device when requesting an electronic horizon (e.g. in case the mobile device is allowed to indicate a desired extent of the electronic horizon with the request).

The method according to the first exemplary aspect, for identifying a position of the mobile device with respect to the electronic horizon, may further comprise one or more of:
    determining a distance traveled by the mobile device from a position for which an indication of a trajectory of the mobile device was provided to the server; and/or
    detecting heading information or heading change information of the mobile device.

As mentioned above, the electronic horizon data may in particular comprise reduced road geometry information. In order to facilitate the identification of a position of the mobile device with respect to the electronic horizon, further information of sensors of the mobile device may be utilized. For instance, a distance traveled by the mobile device from a position for which an indication of a trajectory of the mobile device was provided to the server may be determined (e.g. by means of an odometer and/or wheel rotation information) and then used to identify a position of the mobile device with respect to the electronic horizon. The indication of a trajectory may in particular comprise a position estimate indicating a respective position, as already mentioned. For instance, heading information or heading change information of the mobile device may be determined (e.g. by means of a gyroscope and/or an accelerometer) and then used to identify a position of the mobile device with respect to the electronic horizon. For instance, measured heading or heading change information of the mobile device can be compared to (expected) heading or heading change information in the electronic horizon. The comparison between heading (change) information in the electronic horizon and the heading (change) information registered by the sensor(s) further aids in determining a position of the mobile device in the electronic horizon.

As already mentioned, the indication of the trajectory may in particular comprise one or more position estimates of the mobile device.

As outlined above, the described approach may in particular be realized on a mobile device or a part thereof. A part of a mobile device may in particular be or comprise a chip or chipset.

For instance, as an input, the mobile device or part thereof may receive data from a file or serial device, which may contain a series of trajectory points. The data may for instance be data from a satellite system (e.g. GNSS data), which may come from a standard NMEA ('/dev/nmea')

device. According to one example, a position (comprising e.g. latitude, longitude, speed, heading and/or timestamp) may be injected. According to another example, a NMEA sentence (e.g. GNSS data protocol, comprising e.g. latitude, longitude, speed, heading and/or timestamp) may be injected (e.g. as a string). Additionally, information from an inertial measurement unit (IMU) may be used (e.g. on top of GNSS data), which may enable dead reckoning. In an example, the device or part thereof may dynamically allocate the main memory. A temporary folder may be used for cache data. The output (such as a speed limit or any other information described herein) may be provided as a C++ interface. The device (e.g. the chip or chipset) may further manage the network interface. For instance, a pro-active network connectivity outage mitigation may be implemented on the device (in particular the chip or chipset). The device may further comprise a power management (i.e., suspend to sleep, etc.)

Further, the method according to the second exemplary aspect may further comprise one or more of:

obtaining the map data from a map database; and/or
    identifying a position of the mobile device with respect to the map data.

As already mentioned, the mobile device may provide, to the server, one or more position estimates of the mobile device (e.g. in response to determining that the electronic horizon needs to be updated). Accordingly, these position estimates are then obtained by the server. In order to obtain the data for constructing the electronic horizon, the server may first obtain relevant map data from a map database (e.g. based on the obtained position estimates). The server may then in identifying a position of the mobile device with respect to the map data (i.e. a map based map match). The server may then predict potential paths which may be taken by the mobile device and construct the electronic horizon not only including information with respect to the current position of the mobile device but also with respect to potential paths predicted to be taken by the mobile device. As described above the electronic horizon is specifically designed for enabling a mobile device to either provide or support the mobile device in providing the one or more ADAS functions.

In an alternative embodiment, the server may, instead of obtaining the one or more position estimates of the mobile device directly from the mobile device, obtain the position estimates from a further entity, such as a server of a vehicle manufacturer, which has received the request or position estimates from the respective vehicles and forwards the (e.g. anonymized) requests to the server. The server then returns the constructed electronic horizon directly or via the server of the manufacturer or via even another device to the vehicle.

It is to be understood that the presentation of the invention in this section is merely by way of examples and non-limiting.

Other features of the invention will become apparent from the following detailed description considered in conjunction with the accompanying figures. It is to be understood, however, that the figures are designed solely for purposes of illustration and not as a definition of the limits of the invention, for which reference should be made to the appended claims. It should be further understood that the figures are not drawn to scale and that they are merely intended to conceptually illustrate the structures and procedures described herein.

DETAILED DESCRIPTION OF THE FIGURES

The aspects of the present disclosure will now be described with reference to exemplary embodiments. While the following description refers to an intelligent speed assistance as an example of an ADAS function, the following example is not limited to intelligent speed limit assistance but can likewise be used in combination with other ADAS functions.

Figure 1:
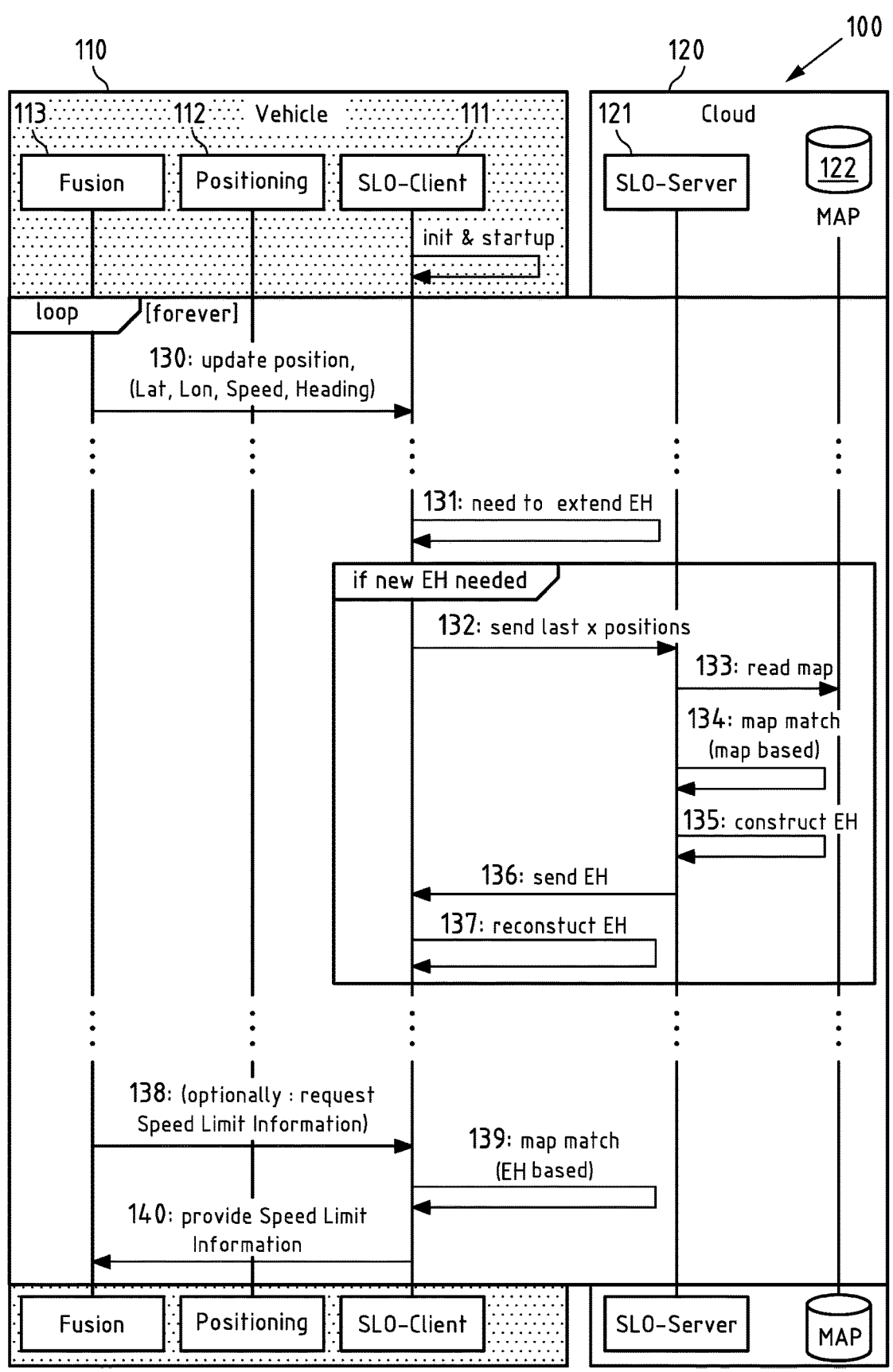
FIG. 1 shows an exemplary message diagram illustrating the internal communication in a vehicle and the communication between the vehicle and a cloud server.

Turning now to FIG. 1, there is shown an exemplary message diagram 100 illustrating the internal communication within a vehicle 110 (as an example of a mobile device) and the communication between the vehicle 110 and a cloud server 120 (as an example of a server). The vehicle 110 and the cloud server 120 form a system 110, 120.

The vehicle 110 comprises a speed limit online client, SLO-Client 111, a positioning component 112 and a (sensor) fusion component 113 for combining sensor data with information from the electronic horizon. The cloud server 120 comprises a speed limit online server, SLO-Server 121 and a map database 122.

Example block diagrams of vehicle 110 and server 120 will also be described further below with reference to FIGS. 4 and 5.

Instead of relying on a locally stored map for understanding the surroundings of the vehicle 110 and providing the location of the different speed limits, exemplary aspects of the present disclosure now propose an online construction of an electronic horizon (EH) that can be provided to the vehicle 110 over a wireless data connection, even if network connectivity is not given for 100% of the driven roads, as will become apparent from the following description.

While vehicle 110 does not have a locally stored map, it is online and connected to the Internet Thus, vehicle client 111 (also referred to as SLO-Client) wants to know a legal speed limit for a current position from an online service. For this, the positioning component 112 (e.g. based on satellite positioning, such as GNSS positioning, cellular/non-cellular network-based positioning, e.g. base on WiFi or mobile networks, or the like) regularly determines a current position of the vehicle 110 and provides it to the SLO-Client 111, action 130. The SLO-Client 111 may check whether the position is already covered by a locally stored electronic horizon and/or whether the vehicle 110 gets close (e.g. below a predefined threshold, e.g. in meters) to the end of a last road segment covered by the current electronic horizon data, action 131. If the SLO-Client 111 determines that the electronic horizon needs to be extended or updated, the SLO-Client 111 in turn sends at least a current vehicle position optionally in combination with heading (e.g. in degrees), an estimated travelling speed information of the vehicle 110 potentially along with a timestamp for the measurement, to a backend server 121 of a cloud service 120, action 132. For instance, a vector (e.g. comprising a single coordinate pair and heading) may already provide a basis for a prediction and could be enough particularly in an area with sparse roads. However, adding speed may improve the prediction (e.g. a higher speed could be associated with a lower likelihood of turning). Still, since a single position often does not suffice to uniquely decide upon the position/ direction or expected travel route of the vehicle in the road network, the SLO-Client may retain some number n of the most recent positions (e.g. n=5) in order to describe a trajectory that usually allows a conclusion upon these factors.

Generally, the above described positioning and/or checking of the position may be performed time-based (e.g. every minute, every 30 seconds, every 5 seconds or the like) or distance-based (e.g. every 100 m, every 20 m, every km). While for a resting mobile device—a distance based approach is advantageous in order to provide meaningful data, for a moving mobile device a time-based or mixed approach is reasonable as well.

The backend server 121 (also referred to as Speed Limit Online-Server, SLO-Server) obtains map data from map database 122, action 133, and performs a map based map matching of the obtained vehicle positions, action 134. The SLO-Server 121 ultimately constructs an electronic horizon, covering probable paths predicted to be taken by the vehicle 110, i.e. generally a certain area in front of the vehicle, as will be explained in more detail below and with reference to FIG. 2.

In other words, the electronic horizon is calculated by means of a cloud service 120, which has the advantages of powerful processing resources, an up-to-date map, as well as permanent connectivity to other services that may deliver required map attributes for speed limit relevant information, for example information on dynamic/variable speed limits on e.g. gantries and electronic signs, etc. In addition, the cloud service 120 may also have access to traffic information and other road network related information for the determination of the electronic horizon.

The geographic area covered by the electronic horizon may be adapted (grow/shrink) e.g. based on a configuration, e.g. a pre-set length of the Most Probable Path (MPP), a pre-set degree of side or sub-paths and/or known cell/data coverage areas.

The SLO-Server 121 responds by transmitting the constructed electronic horizon to the SLO-Client 111 of the vehicle 110 and the SLO-Client 111 receives and stores the electronic horizon locally, action 136.

The electronic horizon may in particular include the Most Probable Path and certain potential sub-paths each with speed limits at the respective link offsets. The electronic horizon may however include certain references to the road geometry at the intersections, information about the lengths (but not geometry) of road links or segments and potentially any additional information required for the respective ADAS function, e.g. information required by sensor fusion component 113 (e.g. country/region specifics such as driving side or country code).

With the above mechanism an electronic horizon is available for a broad area in front of the vehicle 110 which can be provided to the fusion component 113 for combining the data with e.g. camera or other sensor data.

As mentioned, the SLO-Client 111 regularly performs a matching of the vehicle position and the electronic horizon, so that the SLO-Client 111 is always aware where the vehicle is located and will request an extension of the electronic horizon if or before the vehicle reaches the edge or border of the electronic horizon to a certain degree.

There are multiple ways for providing this data to subsequent processing units (normally the fusion component 113) inside the vehicle 110. For instance, on request of the fusion component 113, action 138, the SLO-Client 111 provides speed limit information and any additionally required information to the fusion component 113. In one example, the data may be provided as a Standard ADASIS messages, action 140. In this case the SLO-Client 111 would work and appear as an electronic horizon provider for the further components of the vehicle—limiting the data to the messages required for the fusion. It is noted, however, that the data which is provided in the ADASIS format inside the vehicle 110 may only be a subset of the cached electronic horizon retrieved from the SLO-Server 121. For this, the received electronic horizon, after being received, reconstructed (i.e. decoded) and stored by the SLO-Client 111, actions 136, 137, the electronic horizon may be distributed (e.g. as an internal or local electronic horizon) within the vehicle, action 140

In any case, as outlined above the vehicle can advantageously rely on an online service for retrieving the relevant speed limit data in the vehicle.

Additionally, it is noted that compared to a system which requests online speed limit data on demand, the described approach can advantageously deal with network outages to a certain degree (as will be described in more detail below). Even in regions or countries where the coverage of the mobile network is very good, unavailability areas (called grey-zones) will happen quite often for a short period of time.

Another advantage of the described approach is the need for only minimal processing power, storage and cache. This will allow vehicle makers to ideally stay with an existing architecture for vehicles without navigation and saving effort for redesign the vehicle architecture to comply with e.g. ISA regulation.

Further, the described approach has the advantage of nevertheless being flexible to provide additional/secondary attributes to the vehicle—dependent on the required information of the respective fusion algorithm or ADAS function to be implemented.

In the following the usage of an electronic horizon, as it may be employed in exemplary aspects of the present disclosure, is now explained in more detail.

Generally, an electronic horizon may be understood as a set of data that provides digital road representations as an input to a vehicle's ADAS system.

The electronic horizon may provide a collection of road information items (as described above) for roads in the vicinity of the vehicle. A typical implementation might represent roads and paths as sequence of road segments, each having a set of attributes. The electronic horizon may comprise a Most Probable Path where the vehicle is expected to drive e.g. based on the previously reported position estimates of the vehicle. The electronic horizon may further include sub-paths, i.e. other roads where the vehicle is likely to drive.

Figures 2A, 2B, 2C:
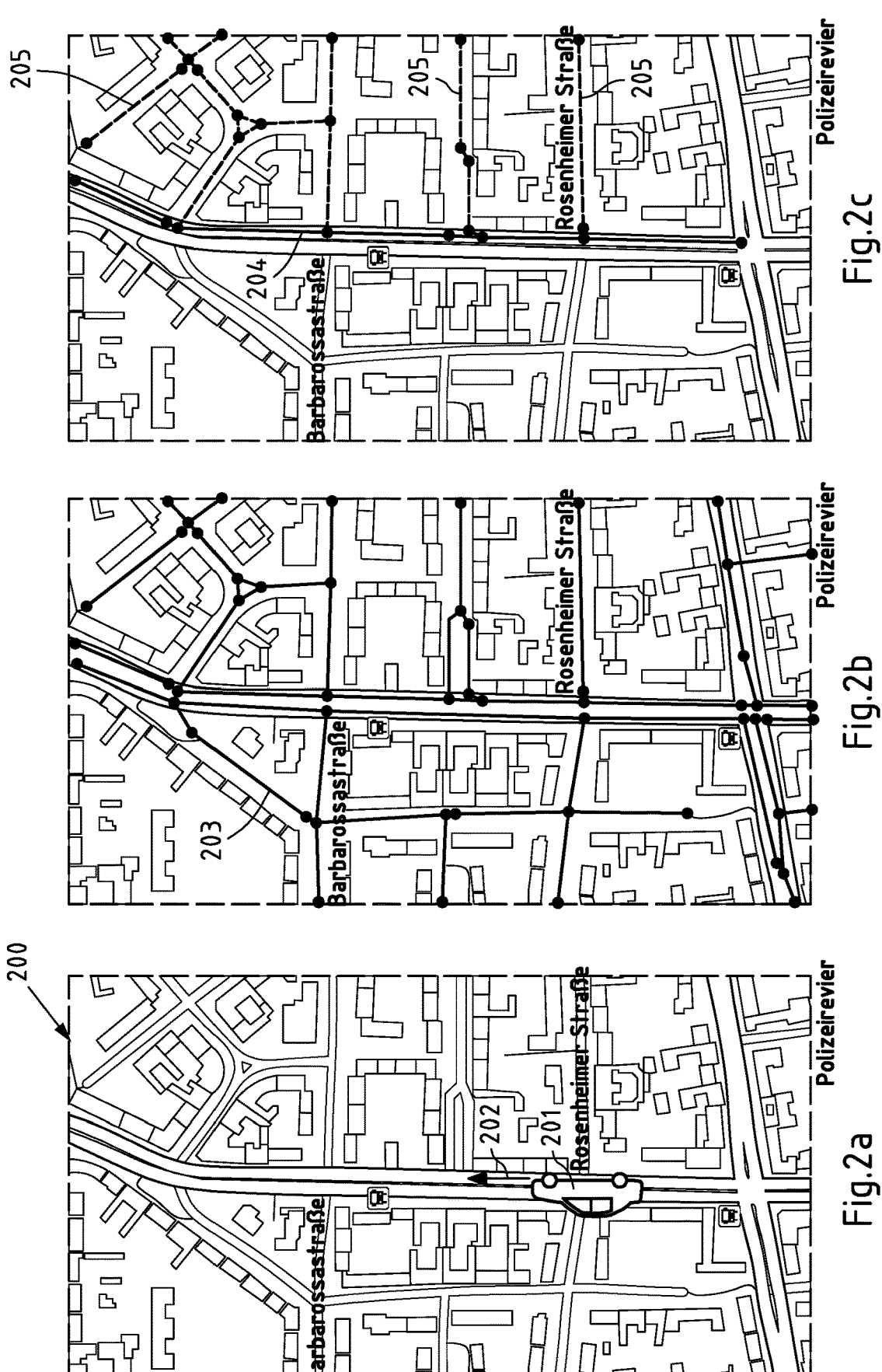
FIG. 2a-c show schematic diagrams of exemplary road networks for illustrating the coverage of an electronic horizon.

Turning now to FIGS. 2*a-c*, FIG. 2*a* shows a road network 200 and illustrates a current position 201 of the vehicle together with a heading 202. For comparison, FIG. 2*b* shows an example, where the electronic horizon would simply comprise all road links or segments 203 in an area around the position of the vehicle. Advantageously, as now shown in FIG. 2c, the exemplary aspects of the present disclosure suggest selecting for the electronic horizon certain road links and segments (Most probably Path 204 and sub-paths 205) which are predicted to be taken by the vehicle. Typically, these selected road segments 204, 205 or links are roughly in the direction of travel of the vehicle. Segments and links e.g. in an opposite direction (or requiring a turn over e.g. 160°) may be excluded.

In any case, to provide a lightweight and reduced data set, it is required to define a geographical limit from the current vehicle position 201 unto where the electronic horizon shall be calculated. In an example, the extent of the electronic horizon may be defined by a parameter that can be fixed to cover up (e.g. at most) to x meters or km from the current vehicle position 201. Additionally or alternatively, the extent may depend on the type of road, on the number of possibilities to turn off, and/or on the probability of using or reaching a road.

For those road segments included in the electronic horizon, attributes are provided as needed by the corresponding ADAS function. For the example of an intelligent speed assistance application, the speed limit itself will typically be the most important attribute, but further attributes may be used by the intelligent speed assistance function. Attributes generally consist of a value and a definition of the stretch of road they apply to.

With a perfect, always up-to-date map, the information provided by the electronic horizon would reflect the ground truth fully and would be sufficient to produce information e.g. for warning the driver about the current speed limit (e.g. by visual, auditory or haptic means), and/or for a speed control system in the vehicle which prevents speeding.

However, it is expected that not all speed limit information is fully accurate in the map e.g. due to temporary signs or due to changing variable speed limits. A vehicle on the road therefore is advised to also perform detection of the posted speed limits using at least one vehicle-mounted camera.

The camera itself may or may not require additional information to perform a road sign detection with high quality. In any case, the data from the camera is then aggregated and combined with the information from the electronic horizon (having been derived from the external map data) in the fusion component 113. The fusion component—and potentially the camera system itself—however require support from the electronic horizon for speed limits in order to reach an acceptable level of precision so that additional/secondary attributes may support the fusion algorithm. These attributes may be provided based on a carmaker's individual needs.

Some of the important secondary attributes are the country code and the type of road. The country code is important as it provides for expected road sign characteristics to perform a detection, as e.g. speed limit signs differ slightly between countries. It also provides information for implicit speed limits—so a city exit sign can directly be correlated with the correct implicit speed limit. The type of road refers to the category of road (Freeway, Highway, Local Road, etc.), which provides an indication of the expected size and position for the posted sign limits in connection with the country code, as well as of the implicit speed limit applying to the road.

Further potentially useful attributes for the camera/fusion system are indications of: Left-hand Driving or Right-hand driving road, Distance to the next intersection, Number of Lanes in driving direction, Number of Lanes in the opposite direction and/or Urban Area Zone. The right/left hand drive attribute (although most probably derivable from country code) can provide an indication of whether to look for speed limit signs on one side or the other. Distances to intersections provide hints to where to search for posted speed limits signs, while the number of lanes in/opposite driving direction aid in estimation of a lateral distance from the vehicle to the speed limit sign. Urban areas may have other constrains for the detection, which may require the vehicle (e.g. a camera fusion algorithm) to operate in a different mode when an urban area is detected base on this attribute, e.g. perform a different segmentation of the captured images than in the open road.

In the following the cloud based electronic horizon realized by the SLO-Server 121 of the cloud 120 will be described in more detail.

As already mentioned, implementing the construction of the electronic horizon based on a digital road map stored locally inside the vehicle, usually in a navigation system, but possibly also in a separate unit, requires significant resources for storing and evaluating the map and for updating the map.

In case the map is stored somewhere remote of the vehicle, it can usually only be accessed via an Internet service and the map data would need to be retrieved by the vehicle as needed. With common maps, the smallest unit of storage that can be downloaded individually is a tile of a certain map layer. Even this smallest unit will, however, contain much more information than the vehicle actually needs about the current road for performing a certain ADAS function, thus consuming significant resources both for data transfer and for processing the map data to extract the relevant information.

Exemplary aspects of the present disclosure first optimizes this approach by using a service outside of the vehicle (i.e. accessible via the Internet) that can provide the vehicle with the exact information that is currently needed depending on the current position of the vehicle and the respective ADAS function(s) to be implemented. This reduces the need for network bandwidth, for storage inside the vehicle, and for processing power on the vehicle side, since the data may basically already come prepared in the way it is needed inside the vehicle.

While this solution can still be considered to have two disadvantages, namely that it fully relies on network connectivity and is unable to provide data in situations where Internet connectivity is unavailable and that it needs to frequently repeat transferring essentially identical data if the vehicle is driving along a road where the characteristics of the road do not change, the concept of exemplary aspects of the present disclosure can resolve these two issues by using a service provided by the SLO-Server 121 of the cloud 120. More specifically, the SLO-Sever 121 transfers to the vehicle not just information relevant at the current location of the vehicle, but an electronic horizon data set providing information about the road the vehicle is traveling for some distance ahead and optionally as well as for side roads that the vehicle might turn into. The software inside the vehicle, i.e. the SLO-Client 111 then extracts from this (already reduced) data set again only the data that currently is relevant for the intelligent speed assistance or other ADAS functions.

It is noted that the term electronic horizon shall be understood in a generic meaning, which does not refer to a specific standard or implementation. Rather, an implementation of this concept may use a proprietary electronic horizon structure which may be optimized for the described purpose.

As becomes apparent from the above, this can optimize the amount of data to be transferred form the SLO-Server 121 to the SLO-Client 111 in the vehicle 110 by using a compact representation providing attribute values together with a definition of the road segment they apply to (instead of needing to resend the same attribute value every time the vehicle needs the value).

In the following, it be described in more detail how the issue of connectivity gaps will be discussed in more detail.

The approach described above may also enable the vehicle to cope with gaps in network connectivity, as once data has been downloaded from the SLO-Server 121, the vehicle 110 does not need to connect to the service again until it is short of reaching the end of a last road segment covered by the electronic horizon data currently available in the vehicle.

The risk of being in a connectivity gap just when new data is needed can be mitigated either by requesting new data from the SLO-Server 121 well in time before reaching the border of the currently available electronic horizon, so there is sufficient time to retry and a sufficiently high likelihood of establishing a network connection at least once until reaching the border of the currently available electronic horizon.

This approach may be further refined if information about the network connectivity along the road is available at the vehicle 110 or the SLO-server 121. For instance, the (geographical) extent of the electronic horizon data provided by the SLO-Server 121 can be adapted to be large enough to bridge eventual connectivity gaps, for instance, adjusting the extent of the electronic horizon based on data network coverage zones.

Figure 3A:
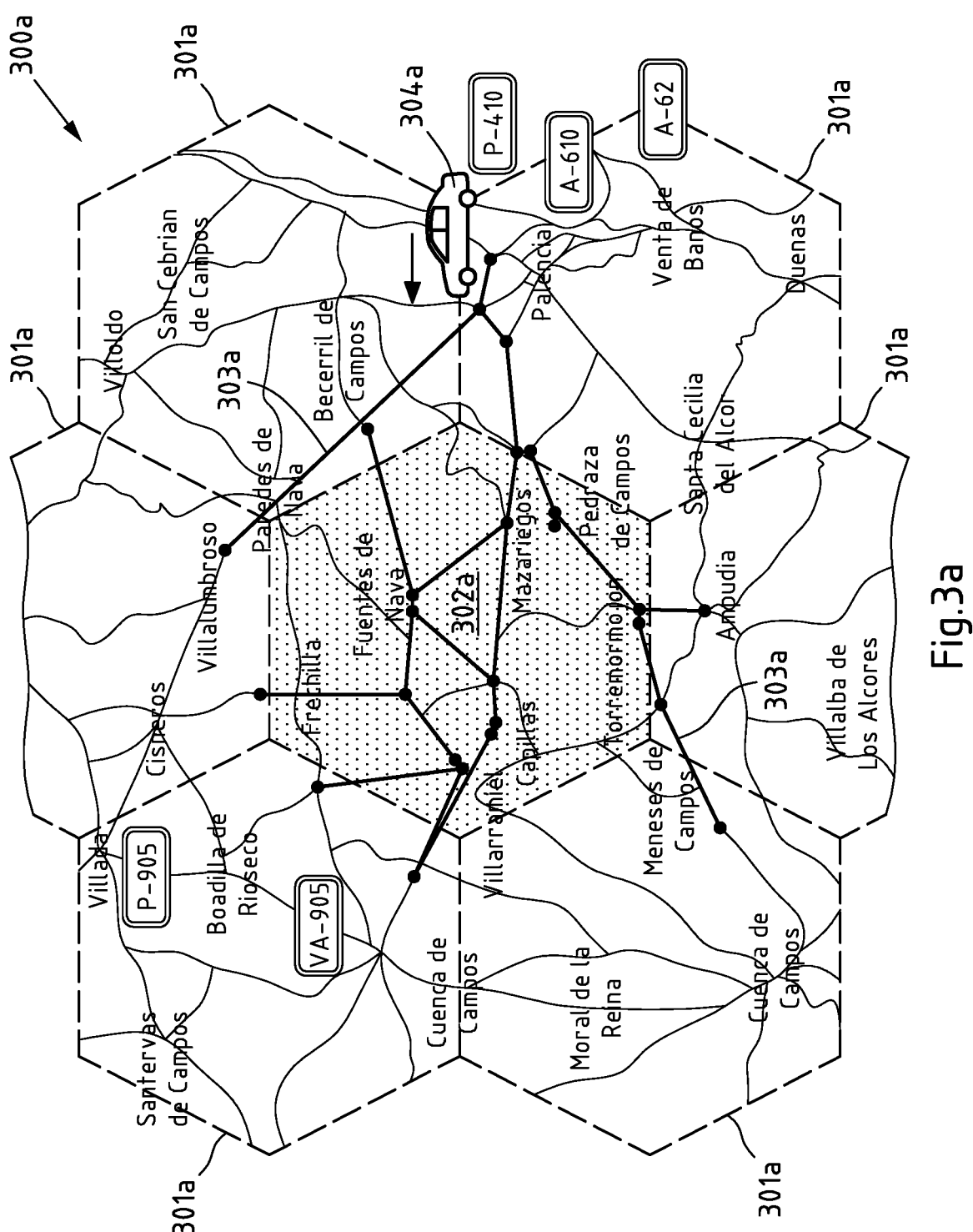
FIG. 3a,b show schematic diagrams of exemplary coverage maps of a communication network for illustrating different extents of electronic horizons.
Figure 3B:
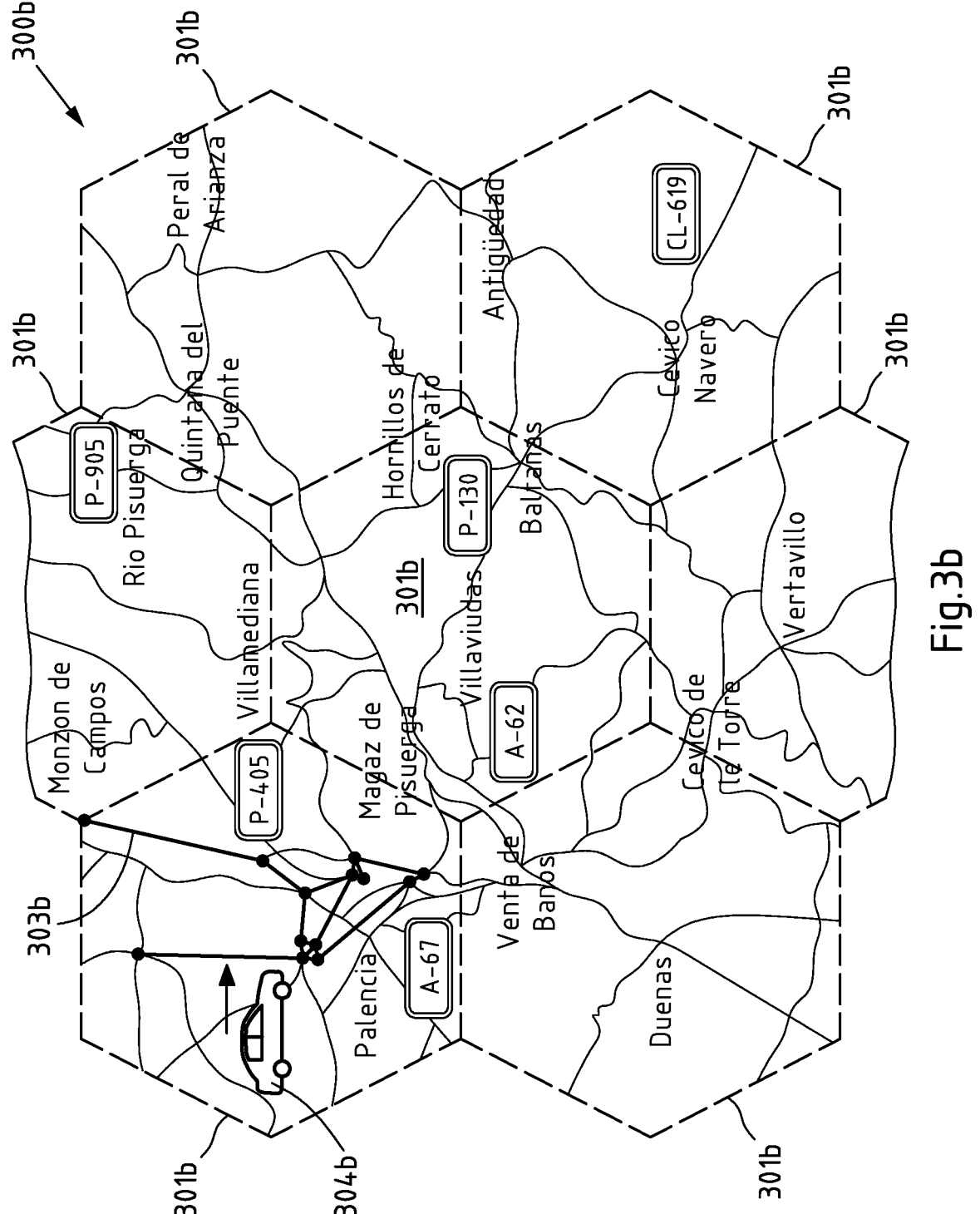

FIG. 3a,b show schematic diagrams of exemplary coverage maps 300a, 300b of a communication network for illustrating this approach for different extents of electronic horizons. In cells 301a sufficient network connectivity is provided, while in cell 302a, no coverage is provided. Using this information, the geographical extent of the electronic horizon can be calculated in dependence of the vehicle's location 304a within the area of data coverage. For example, when a vehicle is expected to drive across the area 302a with no network coverage, the geographical extent of the electronic horizon can be increased so as to not end in this area 302a. Rather the road link(s) 303a included in the electronic horizon end in the adjacent areas 301a, where network coverage will be available again. As a result the electronic horizon bridges the area 302a and continues to provide respective ADAS functionality (e.g. speed limit information) even in this area 302a. However, if it is detected based on the connectivity information that the position 304b of the vehicle is in or towards an area 301b where there is good network connectivity, the number or extent of the road links 303b and thus the extent of the electronic horizon can be reduced to optimize the electronic horizon data payload size. Note, that while FIG. 3a,b show a regular hexagon depiction for simplicity, coverage areas can take different, irregular shapes and irregular sizes, of course.

While in the above described embodiment, the cloud service 120 receives the electronic horizon build request (action 132) directly from the vehicle 110, the request may also come from other entities in alternative embodiments. For instance a vehicle OEM may receive its vehicle fleet's requests and forwards them to the SLO-Server 121 in the cloud 120. This setup may allow for shifting the anonymization requirements to the OEM, i.e. the SLO-Server 121 could reply to the requests with communication session IDs with an unknown relation to a specific vehicle. The SLO-Server again uses the n recent position estimates to create an electronic horizon, containing the attributes discussed in the previous section. The electronic horizon is then provided to the vehicle (e.g. directly or alternatively via the OEM).

It a further advantageous embodiment, Protocol Buffers may be used for the above described client server communication and for encoding of an electronic horizon data structure to optimize on data volume. In one example, the electronic horizon data structure may contain a list of road segments or paths, where each segment or path has a list of attributes e.g. with attribute type, value and/or offset range along the segment or path that the attribute applies to, and optionally a list of intersections each containing a list of side paths (making this a recursive data structure) with their headings or turn angles.

As mentioned, it is not necessary that the electronic horizon data contains the full road geometry information (e.g. latitude and longitude of shape points along the road, or possibly a spline, clothoid or other curve based representation), as this approach requires a significant data transfer volume for the geometry data, as well as a complex map matching algorithm consuming processing power. In order to nevertheless be able to identify the position of the vehicle with respect to the electronic horizon one or more of the following approaches may be employed:

The electronic horizon data may already contain information on the location of the vehicle corresponding to the most recent position estimate provided in the request. This information may be provided as an offset on the most probable path.

The vehicle may measure the distance traveled since that position estimate, e.g. by using wheel rotation information.

The SLO-Client 111 may use this distance information to update its position on the road represented by the electronic horizon, typically by just adding up the distance traveled to the offset on the most probable path.

Preferably, the SLO-Client 111, though, should be able to detect turns, e.g. to detect situations where the vehicle leaves the most probable path or generally any road. For this the SLO-Client 111 may monitor the heading of the vehicle (as contained in the position estimates, from a GNSS or from a fusion with other sensors) and/or heading changes (as measured e.g. by a gyroscope, compass and/or steering wheel movement patterns). Specifically relying on a gyroscope or a compass may be less error prone than relying on steering angles, as these will probably filter out quick movements that avoid potholes, overtakes, etc. which may be picked up when monitoring the steering wheel/column only. For this, the electronic horizon data contains either headings for the roads entering and leaving an intersection, or directly turn angles. If the SLO-Client 111 finds that the vehicle is near (e.g. below a distance threshold) an intersection (using its current position in the electronic horizon data and comparing it to the start points of sub-paths or to explicit intersection information in the electronic horizon data), then the SLO-Client 111 compares the heading or heading change information from the vehicle to the heading or turn angle information from the electronic horizon data to decide if the vehicle has turned off the previous road, and if so, which sub-path it now might be driving on.

Alternatively or additionally, the SLO-Client 111 can use the heading or heading change information from the vehicle also when not near an intersection, e.g. to find if the vehicle has made a U-turn or turned into a driveway or parking site. The electronic horizon data can provide additional information on road heading or road heading change at locations where the road turns sharply, so that the SLO-Client 111 does not mistake e.g. following a sharp curve in the road for turning off the road (e.g. mistake a hairpin curve for a U-turn).

The exemplary aspects and embodiments of the present disclosure may thus have the following advantages:

Lightweight Solution—no map required on the vehicle, low hardware requirements

Covering network outages to a certain extend

Optimizing data transferred over the air to the vehicle

Flexibility with respect to additional attributes needed for fusion algorithm

Figure 4:
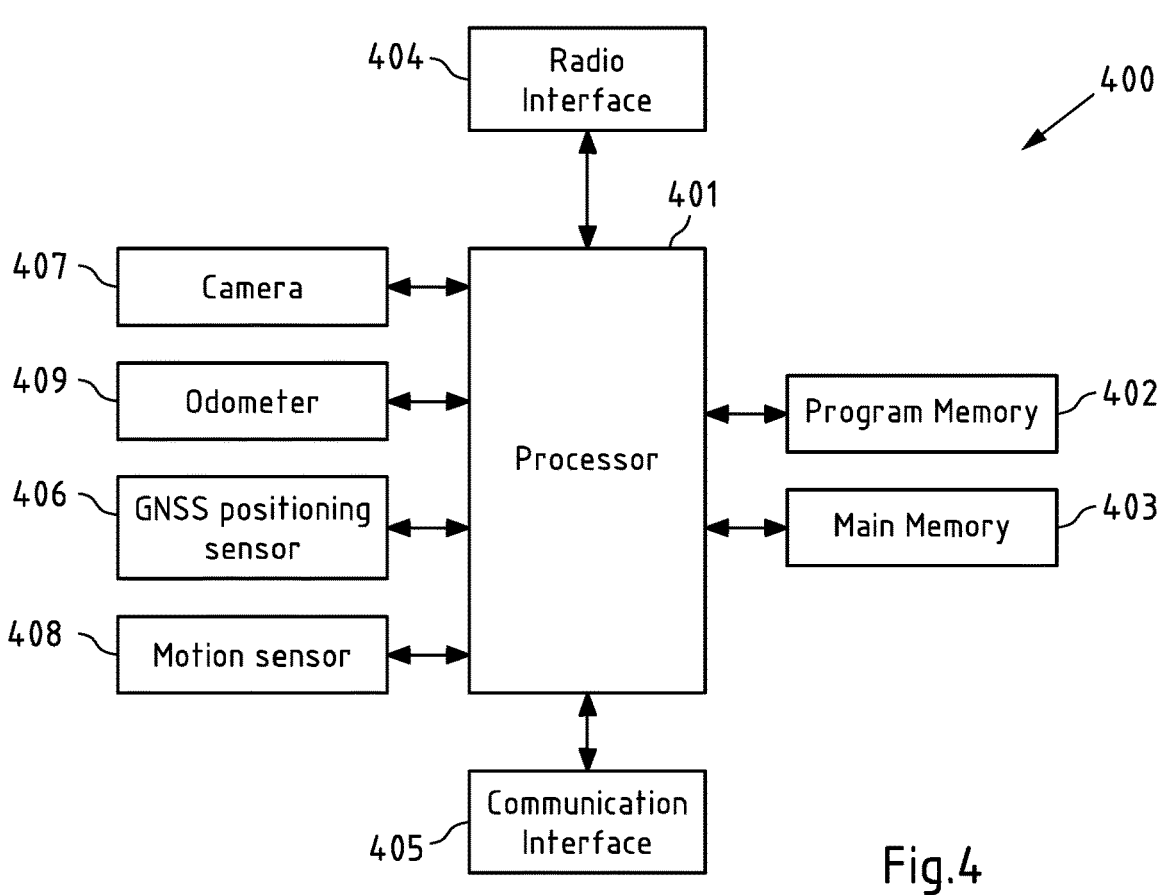
FIG. 4 shows a block diagram of an exemplary embodiment of a mobile device according to the invention.

Availability of most recent data on the server side, including e.g. dynamic speed limits Turning now to FIG. 4 showing a block diagram with relevant components of a mobile device 400, such as vehicle 110 described above. However, block diagram of FIG. 4 may also be representative of other mobile device such as a smartphone, a tablet computer, a notebook computer, a navigation system or the like.

Mobile device 400 comprises a processor 401. Processor 401 may represent a single processor or two or more processors, which are for instance at least partially coupled, for instance via a bus. Processor 401 executes a program code stored in program memory 402 (for instance program code causing mobile device 400 to perform one or more of the embodiments of a method according to the present disclosure or parts thereof, when executed on processor 401), and interfaces with a main memory 403. Program memory 402 may also contain an operating system for processor 401. Some or all of memories 402 and 403 may also be included into processor 401.

One of or both of a main memory and a program memory of a processor (e.g. program memory 402 and main memory 403) could be fixedly connected to the processor (e.g. processor 401) or at least partially removable from the processor, for instance in the form of a memory card or stick.

A program memory (e.g. program memory 402) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples.

For example, a program memory may for instance comprise a first memory section that is fixedly installed, and a second memory section that is removable from, for instance in the form of a removable SD memory card.

A main memory (e.g. main memory 403) may for instance be a volatile memory. It may for instance be a DRAM memory, to give non-limiting example. It may for instance be used as a working memory for processor 401 when executing an operating system and/or programs.

Any of the memories 402, 403 may be used for (at least temporarily) storing electronic horizon data, as described above.

Processor 401 further controls a radio interface 404 configured to receive and/or output data and/or information. For instance, radio interface 404 may be configured to receive radio signals from a radio node. The radio interface 404 is configured to receive radio signals that are transmitted by radio nodes of e.g. a WiFi (WLAN) network and/or any other radio communications system. For example, radio interface 404 may comprise a WLAN radio interface including at least a WLAN receiver (RX). The WLAN receiver may also be a part of a WLAN transceiver. The WLAN receiver may aid in determining a position of the mobile device.

Moreover, processor 401 controls a communication interface 405 which is for example configured to communicate according to a cellular communication system like a 2G/3G/4G/5G or future generation cellular communication system. Mobile device 400 may use communication interface 405 to communicate with a server, e.g. with SLO-Server 121 depicted in FIG. 1. Accordingly, the mobile device 400 may obtain an electronic horizon over communication interface 405, as described above.

Furthermore, processor 401 may control a GNSS positioning sensor 406 (e.g. a GPS sensor or any other GNSS positioning techniques). GNSS positioning sensor may be configured to receive satellite signals of a GNSS system (e.g. GPS satellite signals) and to determine a position of the mobile device 400 at least partially based on satellite signals of the GNSS system that are receivable at this position.

Furthermore, processor 401 may control further optional means and in particular sensors for performing ADAS functions. For instance, mobile device may in particular comprise one or more of a camera 407 (which may provide data to fusion component 113 or which may obtain information from the SLO-Client 111 for supporting the working of the camera 407), a motion sensor 408, such as an accelerometer or a gyroscope, and/or an odometer 409, which may be used in determining a position of the mobile device.

The components 402 to 409 of mobile device 400 may for instance be connected with processor 401 by means of one or more serial and/or parallel busses.

It is to be understood that mobile device 400, depending on the type of device, may comprise various other component, such as a user interface (e.g. a touch-sensitive display, a keyboard, a touchpad, a display, etc.) to name but one example.

Figure 5:
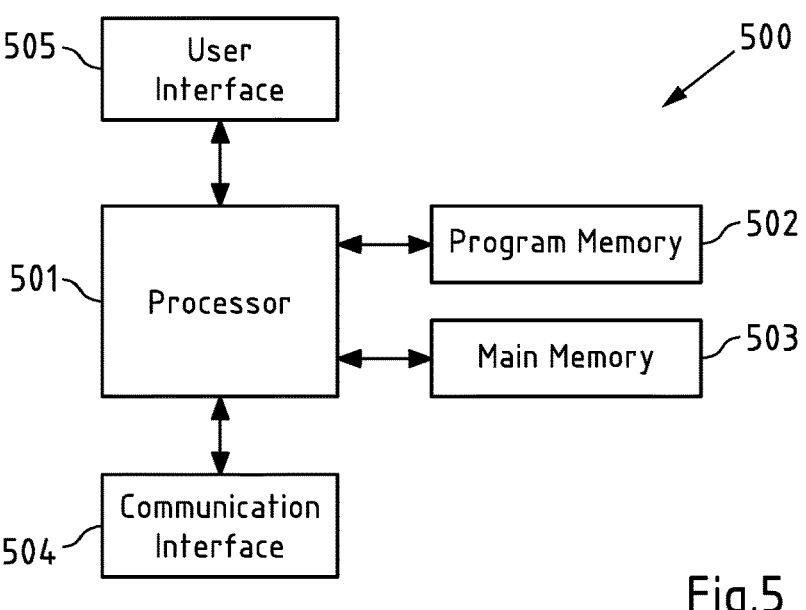
FIG. 5 shows a block diagram of an exemplary embodiment of a server according to the invention.

Turning now to FIG. 5, there is shown a block diagram of an exemplary embodiment of a server 500, such as SLO-Server 121 of FIG. 1.

For instance, server 500 may be used for the online construction of electronic horizons in order to provide respective electronic horizons to the vehicles, as described in detail above.

Server 500 comprises a processor 501. Processor 501 may represent a single processor or two or more processors, which are for instance at least partially coupled, for instance via a bus. Processor 501 executes a program code stored in program memory 502 (for instance program code causing server 500 to perform one or more of the embodiments of a method according to the present disclosure or parts thereof, and interfaces with a main memory 503.

Program memory 502 may also comprise an operating system for processor 501. Some or all of memories 502 and 503 may also be included into processor 501. Any memory may be used for storing map data and for storing constructed electronic horizons. As illustrated in FIG. 1, server 500 may also comprise a map database or have access to a map database server, for obtaining respective map data.

Moreover, processor 501 controls a communication interface 504 which is for example configured to communicate according to a cellular communication system like a 2G/3G/4G/5G or future generation cellular communication system. Communication interface 504 of server 500 may be provided for communicate between mobile device 400 and server 500 (e.g. vehicle 110 and SLO-Server 120 of FIG. 1).

Server 500 may further comprise a user interface 505 (e.g. a touch-sensitive display, a keyboard, a touchpad, a display, etc.).

The components 502 to 505 of server 500 may for instance be connected with processor 501 by means of one or more serial and/or parallel busses.

It is to be understood that server 500 may comprise various other components.

Figure 6:
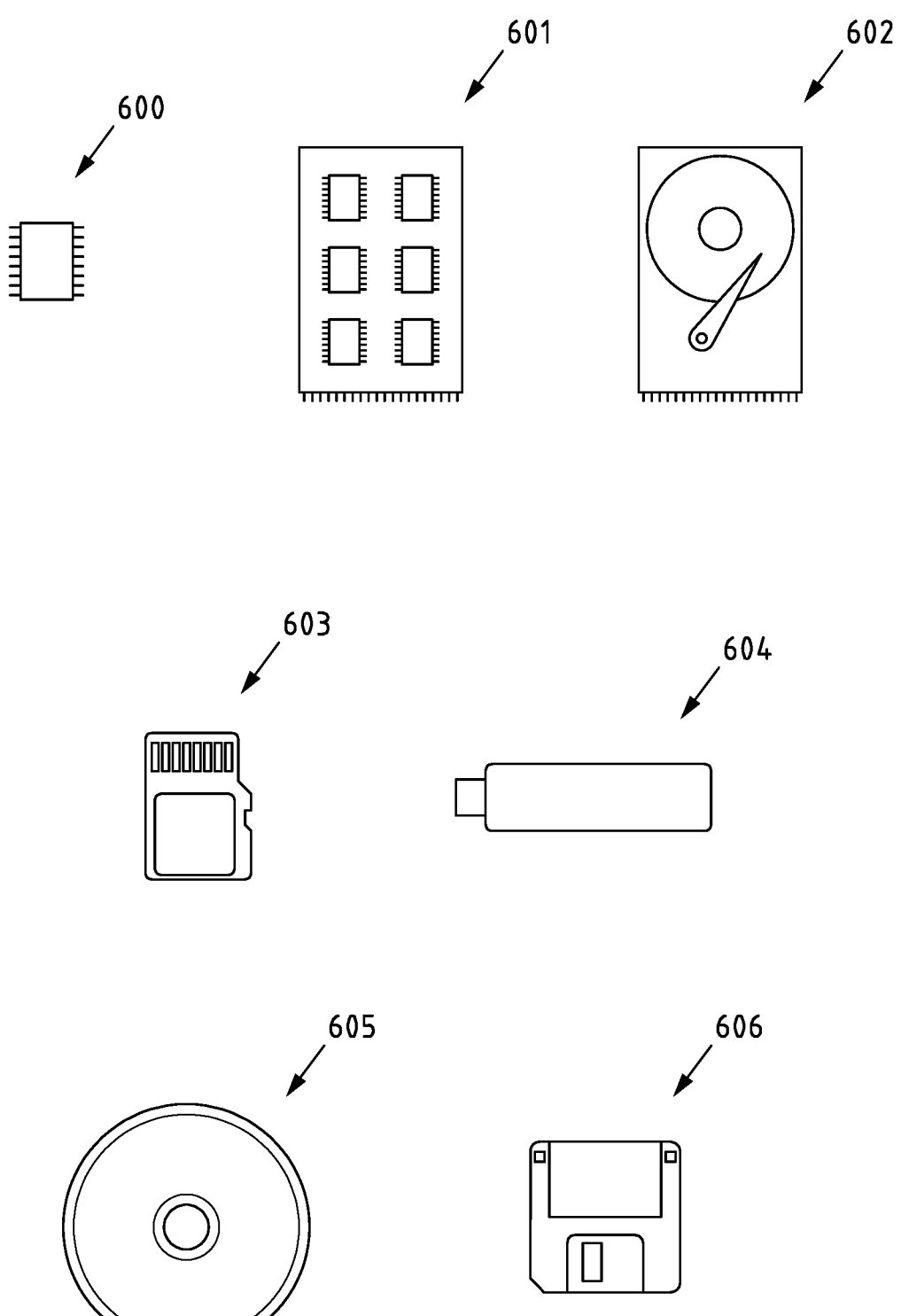
FIG. 6 shows a schematic illustration of examples of tangible and non-transitory storage media according to the invention.

FIG. 6 is a schematic illustration of examples of tangible and non-transitory computer-readable storage media according to the present invention that may for instance be used to implement memory 402 of FIG. 4 or memory 502 of FIG. 5. To this end, FIG. 6 displays a flash memory 600, which may for instance be soldered or bonded to a printed circuit board, a solid-state drive 601 comprising a plurality of memory chips (e.g. Flash memory chips), a magnetic hard drive 602, a Secure Digital (SD) card 603, a Universal Serial Bus (USB) memory stick 604, an optical storage medium 605 (such as for instance a CD-ROM or DVD) and a magnetic storage medium 606.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following: (a) hardware-only circuit implementations (such as implementations in only analog and/or digital circuitry)

(b) combinations of circuits and software (and/or firmware), such as: (i) to a combination of processor(s) or (ii) to sections of processor(s)/software (including digital signal processor(s)), software, and memory(ies) that work together to cause an apparatus, such as a mobile phone, to perform various functions) and (c) to circuits, such as a microprocessor(s) or a section of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 401 and 501 of FIGS. 4 and 5, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method, performed at least by a mobile device or a part thereof, the method comprising:

providing an indication of a trajectory of the mobile device to a remote server;

obtaining, from the remote server, an electronic horizon comprising electronic horizon data for one or more advanced driver assistance systems (ADAS) functions of the mobile device comprising at least an intelligent speed assistance function, wherein the electronic horizon has been constructed from map data by the server to enable the mobile device to perform the one or more ADAS functions, wherein the electronic horizon covers one or more potential paths predicted to be taken by the mobile device based on the indication of the trajectory; and performing at least one of the following:

causing performance, by the mobile device, of at least one of the one or more ADAS functions by identifying a speed limit that the mobile device is recommended not to exceed based at least in part on the electronic horizon, or performing at least one of the one or more ADAS functions by causing an action that prevents the mobile device from exceeding the speed limit based at least in part on the electronic horizon.

2. The method according to claim 1, wherein the electronic horizon is obtained by repeatedly obtaining a replacement electronic horizon comprising replacement electronic horizon data.

3. The method according to claim 1, wherein the electronic horizon data comprises reduced road geometry information.

4. The method according to claim 1, wherein the method further comprises:

constructing, based on the obtained electronic horizon, an internal electronic horizon for distributing the electronic horizon data obtained with the electronic horizon within the mobile device.

5. The method according to claim 1, wherein the method further comprises:

obtaining sensor data from one or more sensors of the mobile device, wherein said performing of at least one of the one or more ADAS functions is further at least partially based on the obtained sensor data.

6. The method according to claim 1, wherein the one or more ADAS functions further comprise one or more of:

a hazard warning function;

an emergency vehicle indication function; and/or a traffic sign detection function.

7. The method according to claim 1, wherein one or more of the following information is comprised by or derivable from the electronic horizon data:

a country code;

a type of a road;

a road heading;

a side of driving;

a distance to a next intersection;

a number of lanes in driving direction;

a number of lanes opposite the driving direction; and/or an indication of an urban area zone.

8. The method according to claim 1, wherein the indication of the trajectory comprises one or more position estimates, heading information and/or speed information of the mobile device and/or wherein the indication of the trajectory is provided in response to determining that the electronic horizon needs to be updated.

9. The method according to claim 1, wherein the method further comprises:

determining that the electronic horizon needs to be updated or replaced in case a remaining extent of the electronic horizon is less than or equal to a minimum extent; and obtaining an updated or replacement electronic horizon with a desired extent.

10. The method according to claim 1, wherein an extent of the electronic horizon takes into account an expected availability of a network connectivity between the mobile device and the server.

11. The method according to claim 1, the method further comprising:

providing, to the remote server, an indication of the one or more ADAS functions to be supported or performed by the mobile device or part thereof.

12. The method according to claim 1, wherein the electronic horizon comprises one or more dynamic features, and wherein the one or more dynamic features comprise one or more of the following:

a dynamic speed limit;

traffic jams;

construction zones;

accident ahead;

wrong way driver;

stopped vehicle on hard shoulder;

items on road;

poor road conditions;

poor weather conditions; and/or emergency vehicle ahead and/or approaching.

13. The method according to claim 1, wherein the method further comprises one or more of:

checking whether the electronic horizon needs to be updated or replaced;

sending and/or receiving a request for information to be used for at least one of the one or more ADAS functions;

identifying a position of the mobile device with respect to the electronic horizon; and/or determining and/or providing information to be used for at least one of the one or more ADAS functions based on the electronic horizon.

14. The method according to claim 13, wherein, for identifying a position of the mobile device with respect to the electronic horizon, the method further comprises one or more of:

determining a distance traveled by the mobile device from a position for which an indication of a trajectory of the mobile device was provided to the server; and/or detecting heading information or heading change information of the mobile device.

15. A method, performed at least by a server or a part thereof, the method comprising:

obtaining, from a remote mobile device, an indication of a trajectory of a mobile device;

constructing an electronic horizon from map data specifically for enabling the mobile device to provide or for supporting the mobile device in providing one or more advanced driver assistance systems (ADAS) functions comprising at least an intelligent speed assistance function that prevents the mobile device from exceeding a speed limit identified based on the electronic horizon, wherein the electronic horizon comprises electronic horizon data for the one or more ADAS functions of the mobile device, wherein the electronic horizon data covers one or more potential paths predicted to be taken by the mobile device based on the indication of the trajectory; and providing, to the mobile device, the electronic horizon for performing, by the mobile device, at least one of the one or more ADAS functions at least partially based on the provided electronic horizon data.

16. The method of claim 15, wherein the indication of the trajectory comprises one or more position estimates of the mobile device.

17. The method of claim 15, wherein the method further comprises one or more of:

obtaining the map data from a map database; and/or identifying a position of the mobile device with respect to the map data.

18. The method according to claim 15, wherein the method further comprises:

determining an extent of the electronic horizon at least in part based on an expected availability of a network connectivity between the mobile device and the server, wherein said constructing of said electronic horizon is at least in part based on said determined extent.

19. The method of claim 15, further comprising:

receiving an update request for the electronic horizon, responsive to the mobile device being located within a threshold distance of the border of the electronic horizon.

20. An apparatus comprising at least one processor and at least one memory including computer program code, the at least one memory and the computer program code configured to, with the at least one processor, cause an apparatus at least to perform:

providing an indication of a trajectory of a mobile device to a remote server;

obtaining, from the remote server, an electronic horizon comprising electronic horizon data for one or more advanced driver assistance systems (ADAS) functions of the mobile device comprising at least an intelligent speed assistance function, wherein the electronic horizon has been constructed from map data by the server to enable the mobile device to perform the one or more ADAS functions, wherein the electronic horizon covers one or more potential paths predicted to be taken by the mobile device based on the indication of the trajectory; and performing at least one of the following:

causing performance, by the mobile device, of at least one of the one or more ADAS functions by identifying a speed limit that the mobile device is recommended not to exceed based at least in part on the electronic horizon, or performing at least one of the one or more ADAS functions by causing an action that prevents the mobile device from exceeding the speed limit based at least in part on the electronic horizon.

\* \* \* \* \*